Figure 6:
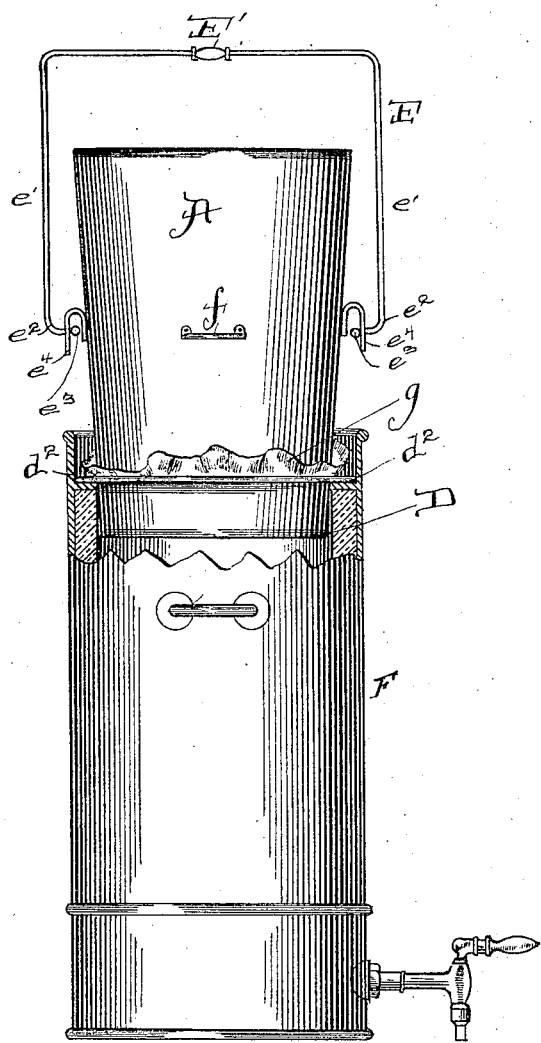

No. 843,727. PATENTED FEB. 12, 1907.
A. E. WHITE.
COFFEE MAKER.
APPLICATION FILED JAN. 19, 1905.
2 SHEETS—SHEET 1.
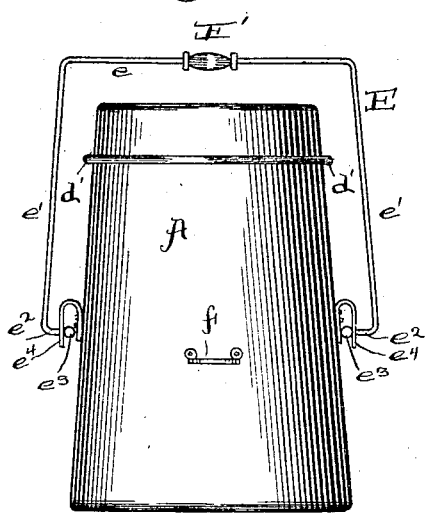
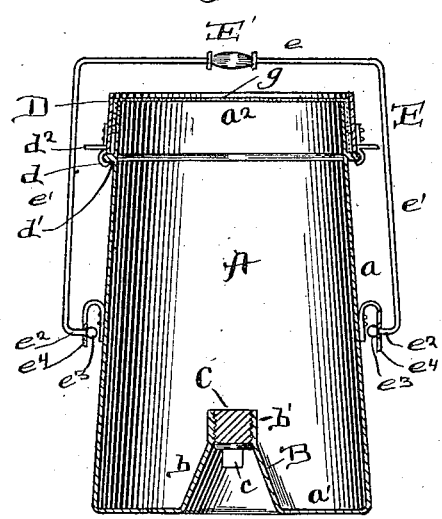
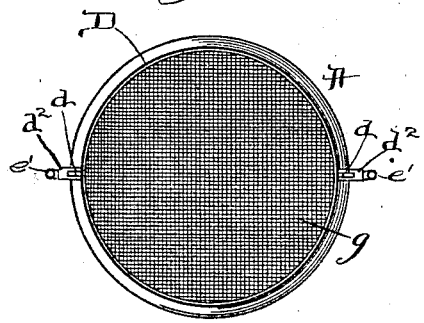
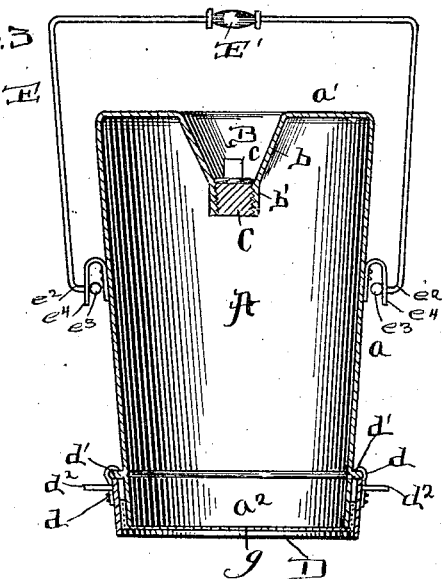
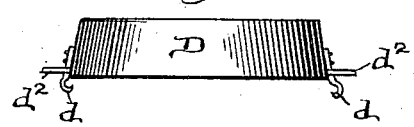

No. 843,727. PATENTED FEB. 12, 1907.
A. E. WHITE.
COFFEE MAKER.
APPLICATION FILED JAN. 19, 1905.

2 SHEETS—SHEET 2.

Witnesses:
Wm. P. Bond
Oscar W. Bond

Inventor
Arthur E. White
By Ramming & Ramming
Attys

UNITED STATES PATENT OFFICE.

ARTHUR E. WHITE, OF CHICAGO, ILLINOIS.

COFFEE-MAKER.

No. 843,727.

Specification of Letters Patent.

Patented Feb. 12, 1907.

Application filed January 19, 1905. Serial No. 241,872.

*To all whom it may concern:*

Be it known that I, ARTHUR E. WHITE, a citizen of the United States, residing at Chicago, in the county of Cook and State of Illinois, have invented certain new and useful Improvements in Coffee-Makers, of which the following is a specification.

The invention relates to appliances for making coffee in which the ground coffee is placed in a vessel and submitted to the action of boiling water in the vessel, and after infusion the liquid is allowed to percolate or drip from the receptacle in which the coffee is made.

The objects of the invention are to improve the construction and operation of the receptacle as regards the placing of the coffee and water therein for infusion and allowing the liquid to percolate or drip therefrom, to enable the receptacle to be placed on end for receiving the coffee and water and inverted without any trouble and inconvenience to allow the liquid to percolate or drip into the coffee pot or urn, to facilitate the application and withdrawal of the straining medium through which the coffee percolates or drips, and to suspend the receptacle in which the coffee is made by a bail, so arranged as to allow of the ready inversion of the receptacle for making the coffee and for allowing the coffee to percolate or drip from the receptacle.

The invention consists in the features of construction and combinations of parts hereinafter described and claimed.

In the drawings, Figure 1 is a side elevation showing the receptacle in position for making the coffee; Fig. 2, a sectional elevation with the receptacle in position for making the coffee; Fig. 3, a sectional elevation with the receptacle inverted to permit the liquid to percolate or drip therefrom; Fig. 4, a top or plan view with the straining material in place; Fig. 5, an elevation of the band for holding the straining material in place, and Fig. 6 an elevation showing the receptacle in which the coffee is drawn mounted on an urn, with the urn broken away at its upper end.

The receptacle or vessel A can be made of sheet metal or other suitable material and preferably has a tapering body or wall $a$ and an end wall $a'$, with the end $a^2$ of the receptacle or vessel opposite to the end wall $a'$ open. The end wall $a'$ has formed therewith or suitably secured thereto a funnel B, inwardly extending and having a side wall or body $b$ terminating in a straight end wall $b'$, with an interior screw-thread to receive the body of a closing-plug C, having a fingerpiece $c$, by means of which the plug can be inserted and withdrawn.

The funnel B is for the purpose of facilitating pouring the coffee back into the receptacle or vessel for renewed or further infusion with the grounds to give additional strength, and the plug C remains in position during the process of infusing the coffee and the percolating or dripping of the liquid from the receptacle or vessel A into the coffee pot or urn.

A band or hoop D, having an interior diameter slightly greater than the exterior diameter of the smaller or open end $a^2$ of the receptacle or vessel A, furnishes the means for retaining a strainer in place over the open end of the receptacle or vessel A for the liquid to percolate or drip through the strainer. The band or hoop D on opposite sides has spring catches or hooks $d$, which when the hoop or band is in place take over a flange or rib $d'$ on the exterior of the receptacle or vessel A and lock the hoop or band in place, and to facilitate the attachment and withdrawal of the hoop or band handles or grabs $d^2$ are provided adjacent to the spring hooks or catches in the arrangement shown.

A bail E, made of wire or other suitable material bent into shape to have a cross or end bar $e$ with a grab E' thereon and side arms or bars $e'$, furnishes a means for handling the receptacle or vessel. The end of each side bar or arm is inwardly turned to form a trunnion $e^2$, terminating in a ball $e^3$ and entered into an ear $e^4$ on the body or wall $a$ of the receptacle or vessel, thereby suspending the receptacle or vessel A within the bail E in such manner that it can be turned into the position shown in Fig. 1 or into the position shown in Fig. 3, as may be required for infusing the coffee or for percolating or dripping the coffee. The body or wall $a$ of the vessel or receptacle has on opposite sides grabs or handles $f$ to assist in inverting or reversing the position of the receptacle or vessel, and the open end of the receptacle or vessel after the ground coffee and the water has been placed therein is covered by a strainer $g$, of cloth or suitable material, so that when the vessel is turned into the position shown in Fig. 3 the liquid will percolate or drip through the strainer.

In use the vessel or receptacle is placed on its larger end, as shown in Fig. 1, with the hoop or band D and the strainer g removed, the filling-funnel for reëntering the coffee being closed by the plug C, as shown in Fig. 2. The ground coffee is placed in the receptacle or vessel and the required amount of boiling water is added thereto and the strainer g is placed over the open end of the vessel and secured in place, so as to be taut, by slipping the hoop or band D onto the end of the receptacle or vessel for the spring catches or hooks d to engage the rib or flange d' and lock the hoop or band in place, so as to hold the strainer firmly in position. After the infusion of the coffee for the desired period of time the receptacle or vessel A is raised by the bail and brought over the coffee pot or urn F, into which the coffee is to be deposited, and when in position the operator, through the bail E and the grab or handle f, inverts the receptacle or vessel A, bringing it into the position shown in Fig. 3, so that the liquid can percolate or pass through the strainer g into the coffee pot or urn F, and during the percolation or dripping of the liquid from the receptacle or vessel A into the coffee pot or urn the plug C remains in position, closing the funnel B, a sufficiency of air being provided to effect percolation by not filling the vessel or receptacle A to its full capacity or by loosening slightly the plug C, maintaining, however, a sufficient closure to prevent the escape of the aroma. In case the coffee is not of sufficient strength when first made the liquid can be drawn from the coffee pot or urn and the funnel B opened by removing the plug C and the coffee returned to the receptacle or vessel A to receive additional strength from the ground coffee, and when the made coffee has been returned to the receptacle or vessel A to the quantity required the funnel B is closed by the plug C and the liquid allowed to percolate or pass through the strainer and into the coffee pot or urn, the opening of the plug C allowing a fresh supply of air to enter while the liquid is being returned to the vessel or receptacle A to be redrawn. The maintaining of the receptacle closed keeps all the aroma and flavor within the receptacle or vessel, so that when the liquid escapes in its finished condition the coffee will have therein all the aroma and flavor of the berries of the coffee.

The funnel B facilitates the return of made coffee, if not of sufficient strength, to the interior of the receptacle or vessel A for the liquid to receive additional strength from the grounds in the receptacle or vessel, and the funnel is only opened for the purpose of returning the made coffee to the receptacle or vessel.

The bail E is shown in Figs. 1, 2, and 3 in its raised position, which is the position it occupies for carrying the receptacle or vessel and for turning the receptacle or vessel end for end; but this bail in use is free to drop down the same as an ordinary bail and is only raised into its elevated position when it is desired to carry the receptacle or vessel and turn the receptacle or vessel for its larger end to be down to make the coffee or for its smaller end to be down to percolate or drip the liquid.

The hoop or band D furnishes a ready means for the attachment and removal of the strainer, it being understood that the strainer is removed when placing the ground coffee and the boiling water in the vessel and is replaced so as to be in position to allow the liquid to percolate or drip therefrom when the vessel or receptacle A is inverted, as shown in Fig. 3, for the liquid to pass into the coffee pot or urn.

The funnel B in addition to furnishing a means for returning the made coffee to the receptacle or vessel for additional infusion to increase the strength also enables a greater quantity of coffee to be made than the amount of water and coffee which can be placed in the receptacle—that is to say, if the receptacle or vessel were adapted to contain enough coffee and water to make two gallons of coffee it can be used for making an additional gallon, it only being necessary to place in the receptacle or vessel the required amount of coffee to produce three gallons of the made coffee, and the additional gallon can be produced by opening the funnel and adding another gallon of water after a gallon of the liquid has been withdrawn, and the added gallon of water will produce from the coffee in the vessel or receptacle the third gallon of made coffee, it being understood that after the gallon of water has been poured into the vessel or receptacle the funnel is to be closed by the plug, and when closed the liquid will percolate or pass through the strainer the same as if no water had been poured into the vessel over the quantity adapted to be contained in the receptacle or vessel.

What I claim as new, and desire to secure by Letters Patent, is—

1. In a coffee-maker, the combination of an invertible vessel having side walls and a wall at one end furnishing an unobstructed base or support for the vessel, and open at the other end, a funnel for the end wall inwardly projecting into the chamber of the vessel and adapted to direct the flow of liquid thereinto, a closure for the vessel adapted to be rigidly inserted into place to prevent leakage when the vessel is supported on its closed end, a band encircling the exterior of the vessel at its open end and furnishing a rest for the vessel on the urn with the open end of the vessel entered into the top of the urn, and a strainer encircled by the band and clamped thereby over the open end of the vessel, substantially as described.

2. In a coffee-maker, the combination of an invertible vessel having a tapered side wall and a wall at the larger end and open at the smaller end, a band encircling the exterior of the vessel at its open end and having a stop supporting the vessel on the urn, spring catches on the band, and a flange circumferal on the side wall engaged by the spring-catches and detachably connecting the band with the end of the vessel, and a strainer entered over the open end of the vessel and drawn taut and held in place by inserting the band in position on the end of the vessel, substantially as described.

3. In a coffee-maker, the combination of a vessel having a tapered side wall and a wall at the larger end and open at the smaller end, a band encircling the exterior of the vessel at its open end and furnishing a rest for the vessel on the urn with the open end of the vessel entered into the top of the urn, a circumferential flange on the side wall, a spring connection between the band and circumferential flange, and a strainer entered onto the open end of the vessel and drawn taut by forcing the band into position on the end of the vessel, substantially as described.

ARTHUR E. WHITE.

Witnesses:
  OSCAR W. BOND,
  WALKER BANNING.